United States Patent [19]

Stibbe

[11] 4,004,663
[45] Jan. 25, 1977

[54] ELECTRICALLY CONTROLLED BRAKE ASSEMBLY WITH NON-COCKING OPERATING ARM

[75] Inventor: Robert L. Stibbe, Janesville, Wis.

[73] Assignee: Warner Electric Brake & Clutch Company, South Beloit, Ill.

[22] Filed: Feb. 17, 1976

[21] Appl. No.: 658,371

[52] U.S. Cl. .............................. 188/332; 188/138; 188/163

[51] Int. Cl.² ...................... B60T 7/12; F16D 51/48

[58] Field of Search .......... 188/331, 332, 333, 342, 188/137, 343, 138, 163, 164

[56] References Cited

UNITED STATES PATENTS

| 3,134,463 | 5/1964 | Birge | 188/138 |
| 3,765,517 | 10/1973 | Grove | 188/138 |
| 3,788,432 | 1/1974 | Marti | 188/138 |

Primary Examiner—Trygve M. Blix
Assistant Examiner—Douglas C. Butler
Attorney, Agent, or Firm—Leydig, Voit, Osann, Mayer & Holt, Ltd.

[57] ABSTRACT

An electrically controlled brake assembly for a vehicle wheel of the type in which an operating arm is mounted between its ends to turn about a pivot on a backing plate and carries at least one electromagnet on one of its ends. Two downwardly projecting tongues are formed on the lower end of the pivoted operating arm of the brake assembly and ride in a channel defined by a guide which is attached to the backing plate of the assembly, the tongues and the guide coacting to prevent the operating arm from cocking on its pivot during braking.

4 Claims, 3 Drawing Figures

U.S. Patent   Jan. 25, 1977   4,004,663
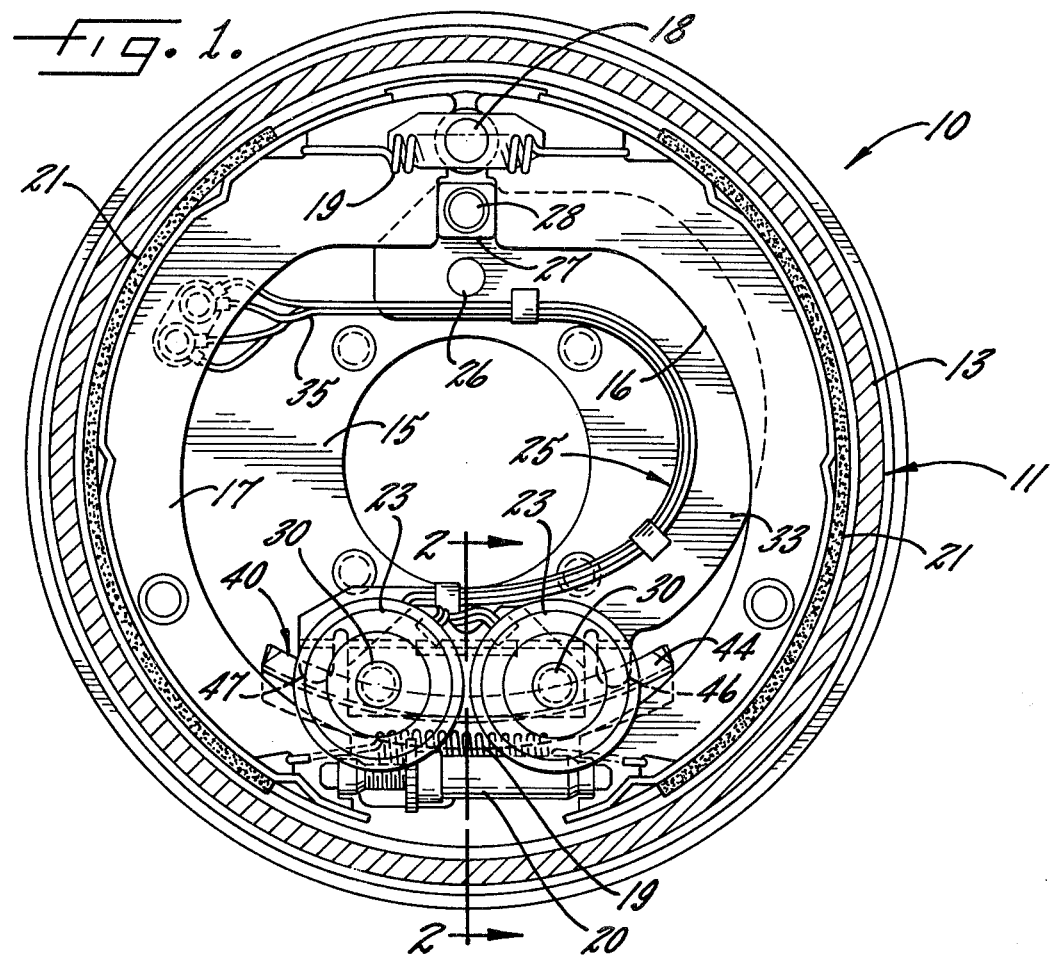
Fig. 1.
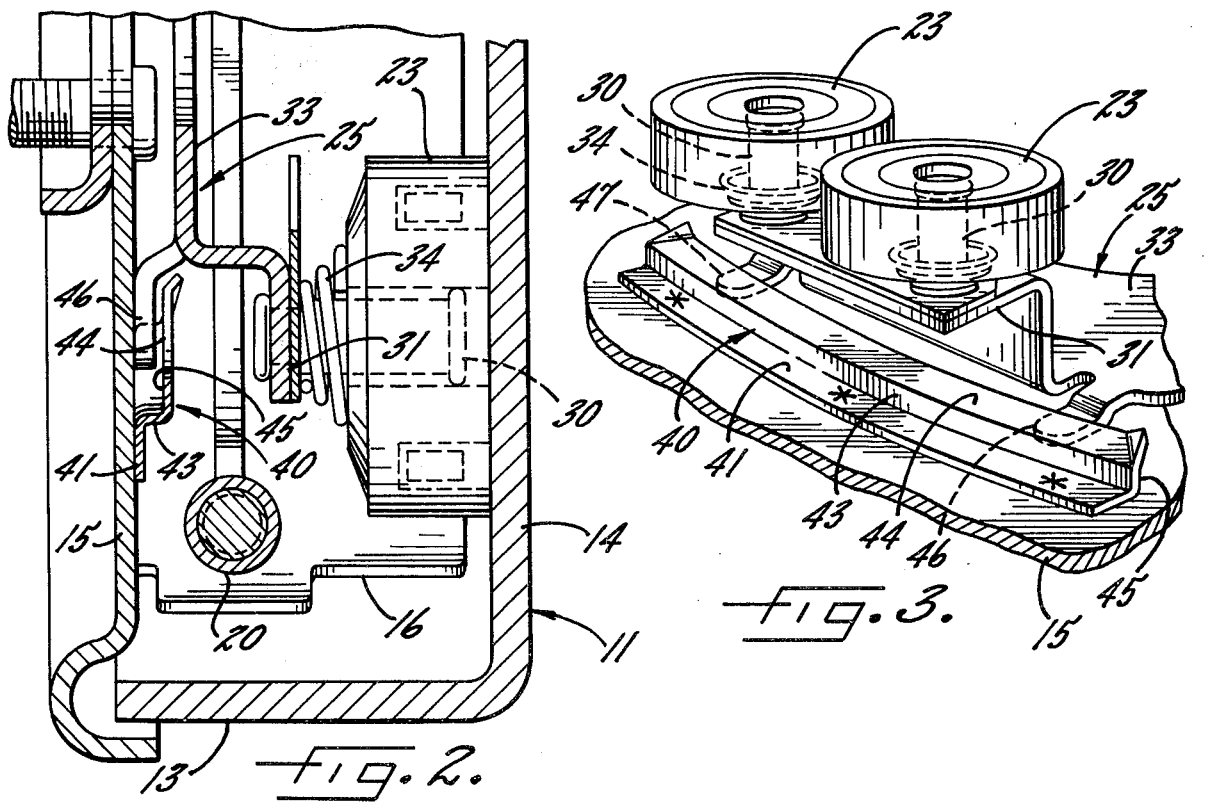
Fig. 2.
Fig. 3.

ELECTRICALLY CONTROLLED BRAKE ASSEMBLY WITH NON-COCKING OPERATING ARM

BACKGROUND OF THE INVENTION

This invention relates to an electrically controlled brake assembly for a vehicle wheel and, more particularly, to a brake assembly of the type in which an operating arm is mounted between its ends to turn back and forth about a pivot on a backing plate and carries at least one electromagnet on one of its ends. When energized, the electromagnet frictionally engages an armature which rotates with and usually forms part of the drum of the vehicle wheel structure. Such frictional engagement causes the operating arm to turn about the pivot in one direction or the other depending upon the direction of rotation of the drum. The end of the operating arm opposite the electromagnet is disposed between a pair of pivoted brake shoes and, depending upon the direction in which the arm is turned, such end bears against one or the other of the shoes to force the shoes outwardly into braking engagement with the drum.

The forces exerted on the two ends of the operating arm during braking are such as to apply a twisting couple to the arm and tend to cock the arm on its pivot. Various arrangements have been proposed to restrict such cocking in order to avoid damaging the operating arm and/or the pivot and to keep the face of the magnet parallel with the face of the armature. Typical examples of such arrangements are disclosed in Birge U.S. Pat. No. 3,134,463 and Marti U.S. Pat. No. 3,788,432.

SUMMARY OF THE INVENTION

The general aim of the present invention is to provide a comparatively simple guide which is located directly adjacent the electromagnet and which coacts with the operating arm in a unique manner to restrict twisting and cocking of the arm, the location of the guide adjacent the magnet serving to more effectively resist such cocking and to more effectively maintain the magnet in parallel relation with the armature.

A more detailed object is to provide the operating arm with spaced projections located on circumferentially opposite sides of the magnet and adapted to coact with the guide and the backing plate to restrict cocking of the arm in both directions of turning and throughout the entire stroke of the arm.

The invention also resides in the relatively simple and inexpensive construction of the guide and the coacting projections.

These and other objects and advantages of the invention will become apparent from the following detailed description taken in conjunction with the accompanying drawings.

BRIEF DESCRIPTION OF THE DRAWINGS

FIG. 1 is a cross-section taken radially through a vehicle wheel structure incorporating the new and improved brake assembly of the present invention.

FIG. 2 is an enlarged fragmentary cross-section taken substantially along the line 2—2 of FIG. 1.

FIG. 3 is a fragmentary perspective view showing the coacting guide and projections along with parts of the operating arm and backing plate.

DETAILED DESCRIPTION OF THE PREFERRED EMBODIMENT

As shown in the drawings for purposes of illustration, the invention is embodied in an electrically controlled brake assembly 10 for selectively slowing or stopping a member such as a vehicle wheel having a rotatable drum 11 comprising a cast iron flange 13 and an integral plate 14. Stationarily mounted on the vehicle is a backing plate 15 which supports the operating elements of the brake assembly.

In this instance, the brake assembly 10 includes a pair of brake shoes 16 and 17 pivotally mounted on the backing plate 15 at 18 and urged to released positions by springs 19, there being an adjustment screw 20 interconnecting the lower ends of the shoes. Friction material 21 is bonded to the shoes and engages the flange 13 of the drum 11 when the brake is applied. To effect such application, at least one, and herein two, electromagnets 23 are mounted on the lower end portion of a curved and substantially C-shaped operating arm 25. The latter is pivotally mounted between its ends on a bushed pin 26 (FIG. 1) on the backing plate 15 and includes an upper end portion or extension which carries a swivel block 27 disposed between the upper ends of the shoes 16 and 17 and pivoted on a pin 28 on the operating arm. Thus, the operating arm is a first class lever which is pivoted to turn in a plane parallel to the backing plate 15 and about an axis (i.e., the pin 26) perpendicular to the plate, the magnets 23 and the swivel block 27 being located on opposite sides of such axis.

As shown, the two magnets 23 are spaced circumferentially from one another on the lower end portion of the operating arm 25 and are telescoped over mounting pins 30 which are staked to a bracket 31 (see FIGS. 2 and 3). The bracket preferably is integral with the operating arm and is formed by bending a portion of the arm outwardly and then downwardly from the plane of the main body 33 of the arm. Coil springs 34 (FIG. 2) are telescoped over the pins 30 and are compressed between the bracket and the magnets to urge the latter outwardly into light rubbing engagement with the plate 14 of the drum 11. When two electromagnets are employed, their mounting pins usually are spaced equidistantly from a plane extending perpendicular to the backing plate 15 and containing the axes of the pins 26 and 28. If a single magnet is used, its mounting pin is located with its axis disposed in such plane.

When energized by current supplied through lead wires 35 (FIG. 1), the magnets 23 frictionally engage the plate 14 of the drum 11, which plate thus forms an armature for the magnets. If the drum 11 is rotating forwardly or clockwise (FIG. 1) when the magnets 23 are energized, frictional engagement between the armature 14 and the magnets will move the latter to the left and cause the operating arm 25 to turn clockwise on the pin 26 and push the swivel block 27 against the end of the brake shoe 16. The latter thus is forced outwardly into braking engagement with the flange 13 of the drum and acts through the adjustment screw 20 to force the shoe 17 outwardly. When the drum is rotating in a counterclockwise direction, energization of the magnets causes the armature to shift the magnets to the right so as to turn the operating arm counterclockwise about the pin 26. Thus, the swivel block 27 pushes against the end of the brake shoe 17 and directly forces that shoe outwardly into engagement with the drum while the screw 20 forces the other shoe 16 outwardly.

The forces exerted on the operating arm 25 during braking result in a couple tending to twist or clock the arm about the pivot pin 26. That is to say, the forces applied to the magnets 23 are transmitted to the pins 30 and the lower end portion of the arm 25 at a location displaced axially outwardly of both the point of support of the arm on the pivot pin 26 and the point at which force is applied to the upper end portion of the arm through the pin 28. This geometry, together with the difference in the length of the relatively long moment arm between the pins 30 and the pin 26 and the shorter moment arm between the pin 26 and the pin 28, produces a couple which tends to cock the curved portion of the operating arm outwardly about the pin 26 (i.e., out of the plane of the drawing) when the arm is turned clockwise and reversely or into the plane of the drawing when the arm is turned counterclockwise. Such cocking can place abnormal stress on the pin 26 and the arm 25, and more importantly, can tilt the magnets 23 so that their faces move out of parallelism with the armature 14 thereby causing excessive wear and creating air gaps which impair effective braking. Cocking of the arm also can cause the outer ends of the pins 30 to contact the armature 14.

In accordance with the present invention, a guide 40 is uniquely located between the magnets 23 and the backing plate 15 and coacts with the plate and the lower end portion of the operating arm 25 to confine the latter to turning in a plane substantially parallel to the plate and thereby prevent the arm from cocking on the pin 26. As a result of being located adjacent the magnets, the guide 40 virtually insures that the magnets will remain parallel to the armature 14 since the guide positively prevents cocking of that very portion of the arm on which the magnets are supported.

More specifically, the guide 40 is formed from a piece of metal having a vertically extending flange 41 (FIGS. 2 and 3) which is welded rigidly to the backing plate 15. Located at the upper end of the flange is an outwardly extending leg 43 whose inner end is integral with the flange and whose outer end is integral with an upwardly extending guide strip 44. By virtue of the leg 43, the guide strip 44 is spaced outwardly from the backing plate 15 and coacts with the latter to define an upwardly opening channel 45. The guide strip is located directly behind the pins 30, is curved accurately about the axis of the pin 26, and is of such arcuate length as to extend beyond the ends of the arc traversed by the lower end portion of the arm 25 when the latter is turned between its two extreme positions.

In carrying out the invention, projecting means in the form of two downwardly extending tongues 46 and 47 are struck inwardly from the lower end of the main body 33 of the operating arm 25 and are located in the channel 45 between the backing plate 15 and the guide strip 44. The tongues are disposed on circumferentially opposite sides of the magnets 23 in that tongue 46 is located to the right of the right-hand mounting pin 30 while the other tongue 47 is located to the left of the left-hand pin 30.

When the arm 25 is turned clockwise about the pin 26 and tends to cock outwardly, the tongue 46 engages and bears outwardly against the guide strip 44 while the tongue 47 simultaneously bears inwardly against the backing plate 15. As a result, the tongues coact with the backing plate and the guide strip to keep the arm from cocking and thus cause the arm to turn about the pin 26 in a plane which is parallel to the backing plate 15 and the armature 14. Similarly, inward cocking of the arm during counterclockwise turning is resisted by engagement of the tongue 47 with the guide strip 44 and by simultaneous engagement of the tongue 46 with the backing plate 15. Thus, the arm is confined against cocking in both directions of turning and throughout its entire stroke and is confined directly adjacent the magnets 23 themselves so as to insure that the magnets remain in flat face-to-face engagement with the armature 14 doing braking and that the pins 30 do not contact the armature.

I claim:

1. An electrically controlled brake assembly for use with a rotatable drum, said brake assembly comprising a stationary backing plate, a pair of brake shoes pivotally mounted on said backing plate and having ends disposed adjacent one another, an operating arm pivoted intermediate its ends on said backing plate to turn about an axis extending substantailly perpendicular to said plate and in a plane extending substantially parallel to said plate, means carried on said operating arm on one side of said axis and located between the adjacent ends of said shoes to bear against one of said shoes when said arm is turned in one direction about said axis and to bear against the other of said shoes when said arm is turned in the opposite direction about said axis, and electromagnet means carried on said operating arm on the opposite side of said axis and operable when energized to engage said drum and cause said operating arm to turn about said axis in one direction or the other depending upon the direction of rotation of said drum, the improvement in said brake assembly comprising, guide means fixed on said backing plate and located between said backing plate and said electromagnet means, said guide means and said backing plate coacting to define a channel means having an open side which faces said axis, and projecting means on said operating arm and located on circumferentially opposite sides of said electromagnet means, said projecting means extending into said channel means from the open side thereof and being engageable with said guide means and said backing plate to confine said operating arm substantially within said plane when said operating arm is turned about said axis.

2. An electrically controlled brake assembly as defined in claim 1 in which said projecting means comprise two projecting tongues spaced from one another and located on circumferentially opposite sides of said electromagnet means, said guide means comprising a strip secured to and spaced from said backing plate and disposed in opposing relation with said tongues.

3. An electrically controlled brake assembly as defined in claim 2 in which said strip is of sufficient circumferential length to be in opposing relation with said tongues throughout the entire turning stroke of said operating arm.

4. An electrically controlled brake assembly as defined in claim 2 in which said operating arm includes a main body portion which is disposed in said plane, said tongues being formed integrally with said main body portion and being disposed between said plane and said backing plate.

* * * * *